(12) United States Patent
Foland et al.

(10) Patent No.: US 11,970,294 B2
(45) Date of Patent: Apr. 30, 2024

(54) APPARATUS AND A METHOD FOR DETERMINING A RESOURCE REMAINING DATUM OF AN ELECTRIC AIRCRAFT

(71) Applicant: BETA AIR, LLC, South Burlington, VT (US)

(72) Inventors: Steven J. Foland, Garland, TX (US); Thomas Henck, South Burlington, VT (US); Herman Wiegman, South Burlington, VT (US)

(73) Assignee: Beta Air, LLC, South Burlington, VT (US)

( * ) Notice: Subject to any disclaimer, the term of this patent is extended or adjusted under 35 U.S.C. 154(b) by 0 days.

(21) Appl. No.: 17/824,382

(22) Filed: May 25, 2022

(65) Prior Publication Data

US 2023/0382570 A1  Nov. 30, 2023

(51) Int. Cl.
*B64U 50/30* (2023.01)
*B60L 58/12* (2019.01)
*G08G 5/00* (2006.01)

(52) U.S. Cl.
CPC ............. *B64U 50/30* (2023.01); *B60L 58/12* (2019.02); *G08G 5/003* (2013.01)

(58) Field of Classification Search
CPC .......... B64U 50/30; B60L 58/12; G08G 5/003
See application file for complete search history.

(56) References Cited

U.S. PATENT DOCUMENTS

| 10,977,880 B2 | 4/2021 | Calkins et al. |
| 11,072,258 B2 | 7/2021 | Kumar et al. |
| 11,089,106 B2 | 8/2021 | Venugopalan et al. |
| 2013/0158750 A1* | 6/2013 | Bosson ................... H02J 3/14 701/3 |
| 2016/0363456 A1 | 12/2016 | Pujos et al. |

(Continued)

FOREIGN PATENT DOCUMENTS

| KR | 101372351 B1 | 8/2013 |
| KR | 101372351 B1 | 3/2014 |
| WO | WO-2021210139 A1 * | 10/2021 |

OTHER PUBLICATIONS

English translation of WO-2021210139-A1 (Year: 2021).*

(Continued)

*Primary Examiner* — Shon G Foley
(74) *Attorney, Agent, or Firm* — Lee & Hayes P.C.; Russell Wagstaff

(57) ABSTRACT

An apparatus for determining a resource remaining datum of an electric aircraft is disclosed. The apparatus includes a processor and a memory communicatively connected to the processor. The memory contains instructions configuring the processor to receive aircraft data from at least a sensing device, wherein the at least a sensing device is configured to measure at least a parameter of a battery pack of the electric aircraft and generate aircraft data as a function of the at least a parameter of the battery pack of the electric aircraft. The memory contains instructions configuring the processor to determine a reserve energy as a function of a flight mode of the electric aircraft and determine a resource remaining datum as a function of the aircraft data and the reserve energy, wherein the resource remaining datum is related to the battery pack of the electric aircraft.

14 Claims, 9 Drawing Sheets

(56) References Cited

U.S. PATENT DOCUMENTS

| | | |
|---|---|---|
| 2017/0249849 A1* | 8/2017 | De Prins .............. G08G 5/0013 |
| 2019/0114929 A1 | 4/2019 | Sasaki |
| 2020/0172262 A1 | 6/2020 | Enke et al. |
| 2020/0277080 A1* | 9/2020 | Wiegman ................ B60L 50/60 |
| 2021/0009282 A1 | 1/2021 | Long et al. |
| 2021/0232144 A1 | 7/2021 | Lee |
| 2022/0274618 A1* | 9/2022 | Charr ................... B60W 50/14 |

OTHER PUBLICATIONS

Quach Cuong Chi, Brian Bole, Edward Hogge, Sixto Vazquez, Matthew Daigle, Jose Celaya, Adam Weber, Kai Goebel, Battery Charge Depletion Prediction on an Electric Aircraft, Oct. 2013.

\* cited by examiner

APPARATUS AND A METHOD FOR DETERMINING A RESOURCE REMAINING DATUM OF AN ELECTRIC AIRCRAFT

FIELD OF THE INVENTION

The present invention generally relates to the field of electric aircraft. In particular, the present invention is directed to an apparatus and a method for determining a resource remaining datum of an electric aircraft.

BACKGROUND

Electric aircraft have many parts and systems that use up fuel and energy stores during operation. A measurement of remaining energy during a flight is helpful for pilots in making safe operational decisions.

SUMMARY OF THE DISCLOSURE

In an aspect of the present disclosure is an apparatus for determining a resource remaining datum of an electric aircraft, including a processor and a memory communicatively connected to the processor. The memory contains instructions configuring the processor to receive aircraft data from at least a sensing device, wherein the at least a sensing device is configured to: measure at least a parameter of a battery pack of the electric aircraft and generate aircraft data as a function of the at least a parameter of the battery pack of the electric aircraft. The memory contains instructions configuring the processor to determine a reserve energy as a function of a flight mode of the electric aircraft and determine a resource remaining datum as a function of the aircraft data and the reserve energy, wherein the resource remaining datum is related to the battery pack of the electric aircraft.

In another aspect of the present disclosure is a method for determining a resource remaining datum of an electric aircraft, comprising: receiving, by a processor, aircraft data from at least a sensing device, wherein the at least a sensing device is configured to measure at least a parameter of a battery pack of the electric aircraft and generate aircraft data; determining, by the processor, a reserve energy as a function of a flight mode of the electric aircraft; and determining, by the processor, a resource remaining datum as a function of the aircraft data and the reserve energy, wherein the resource remaining datum is related to the battery pack of the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for determining a resource remaining datum of an electric aircraft. The apparatus includes a processor and a memory communicatively connected to the processor. The memory contains instructions configuring the processor to receive aircraft data from at least a sensing device, wherein the at least a sensing device is configured to measure at least a parameter of a battery pack of the electric aircraft and generate aircraft data as a function of the at least a parameter of the battery pack of the electric aircraft. The memory contains instructions configuring the processor to determine a reserve energy as a function of a flight mode of the electric aircraft and determine a resource remaining datum as a function of the aircraft data and the reserve energy, wherein the resource remaining datum is related to a battery pack of the electric aircraft.

Aspects of the present disclosure can be used to predict most limiting parameters of flights of electric aircraft using a most limiting parameter machine learning model. Aspects of the present disclosure can also be used to alert a user, such as a pilot, to a flight parameter exceeding an operational threshold. This is so, at least in part, a pilot may be alerted of a flight parameter that may limit a flight range.

Aspects of the present disclosure allow for informed flight planning and analytics. A most limiting parameter may assist in determining flight paths, generating power saving flight plans, and the like. Exemplary embodiments illustrating aspects of the present disclosure are described below in the context of several specific examples.

Figure 1:
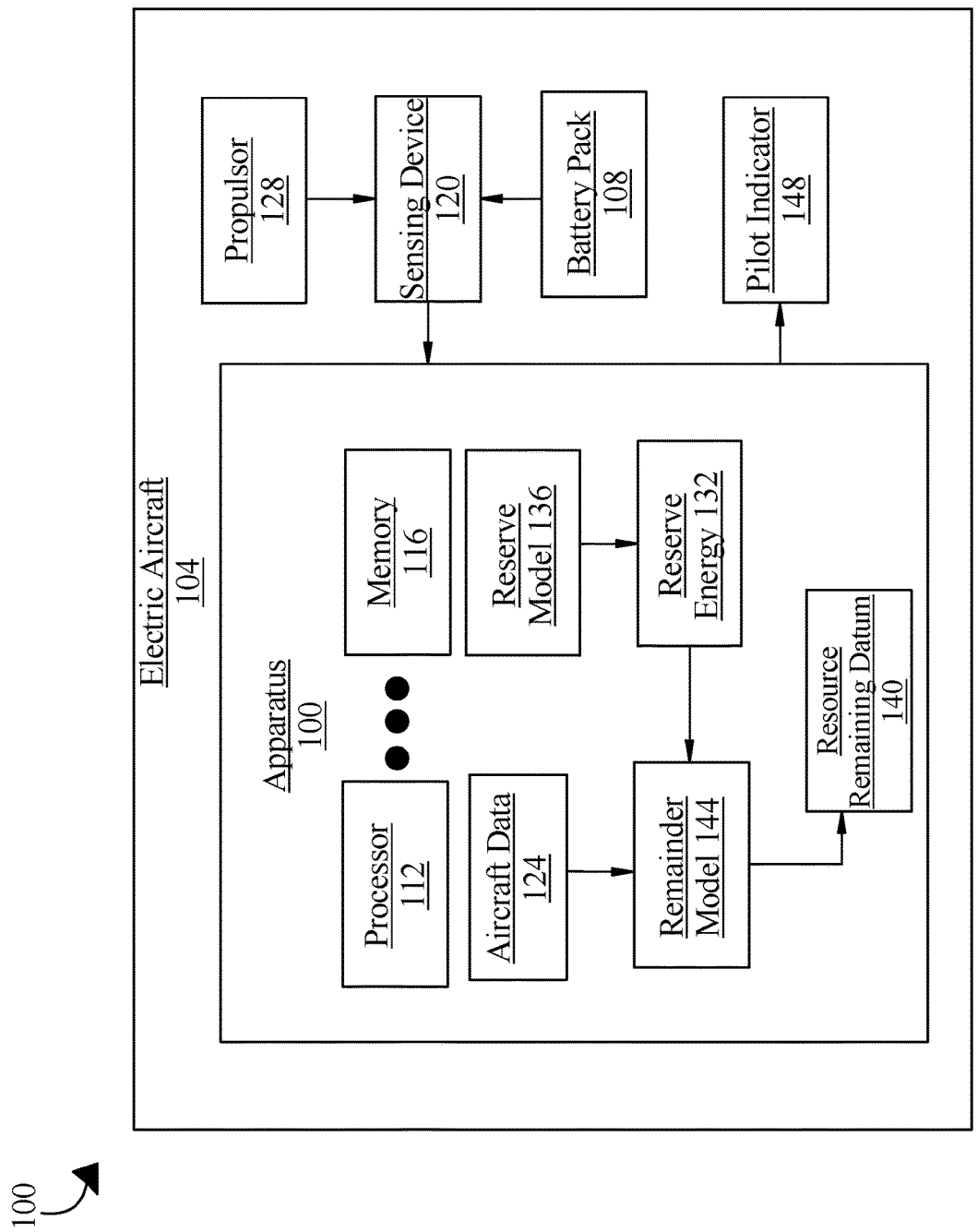
FIG. 1 is an exemplary embodiment of an apparatus for determining a resource remaining datum of an electric aircraft.

Referring now to FIG. 1, an exemplary embodiment of an apparatus 100 for determining a resource remaining datum of an electric aircraft is illustrated. Electric aircraft 104 may be powered by one or more electric motor. Electric aircraft 104 may include electrical vertical takeoff and landing (eVTOL) aircraft, helicopter, unmanned electric aircrafts (UAVs), drones, rotorcraft, commercial aircraft, and/or the like. Electric aircraft 104 may include one or more components that generate lift, including without limitation wings, airfoils, rotors, propellers, jet engines, or the like, or any other component or feature that an aircraft may use for mobility during flight. Electric aircraft 104 may be configured for fixed-wing flight, such as fixed-wing cruising and/or fixed-wing landing, and/or rotor-based flight, such as rotor-based hovering and/or vertical roto-based landing. Fixed-wing cruising and fixed-wing landing may require less battery power than rotor-based hovering and vertical rotor-based landing, respectively. "Rotor-based flight", as used in this disclosure, is a flight mode where the aircraft generates lift and propulsion by way of one or more powered rotors coupled with an engine, such as a "quad copter," helicopter, or other vehicle that maintains its lift primarily using downward thrusting propulsors. "Fixed-wing flight", as described herein, is a flight mode where the aircraft is capable of flight using wings and/or foils that generate life caused by an aircraft's forward airspeed and the shape of the wings and/or foils, such as in airplane-style flight.

Still referring to FIG. 1, at least a battery pack 108 may be in electric aircraft 104 and configured to provide electrical power to the electric aircraft 104. Battery pack 108 may include one or more battery modules, which each may include one or more battery cells, as discussed in detail below. Each battery cell may include an electrochemical cell such as, for example, a lithium ion cell. Battery pack 108 may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 604A-B may include lead-based batteries such as without limitation lead acid batteries and lead carbon batteries. Pouch cells 604A-B may include lithium sulfur batteries, magnesium ion batteries, and/or sodium ion batteries. Batteries may include solid state batteries or supercapacitors or another suitable energy source. Batteries may be primary or secondary or a combination of both. Battery pack 108 may be consistent with disclosure of battery pack in U.S. patent application Ser. No. 17/348,960 filed on Jun. 16, 2021 and titled "BATTERY PACK FOR ELECTRIC VERTICAL TAKE-OFF AND LANDING AIRCRAFT", which is incorporated in its entirety herein by reference. Additional disclosure related to batteries and battery modules may be found in U.S. patent application Ser. No. 16/948,140 filed on Sep. 4, 2020 and titled "SYSTEM AND METHOD FOR HIGH ENERGY DENSITY BATTERY MODULE" and U.S. patent application Ser. No. 16/590,496 filed on Oct. 2, 2019 and tilted "SYSTEMS AND METHODS FOR RESTRICTING POWER TO A LOAD TO PREVENT ENGAGING CIRCUIT PROTECTION DEVICE FOR AN AIRCRAFT"; the entirety of both applications are incorporated herein by reference.

Apparatus 100 may include at least a processor 112. Processor 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 112 may include a single computing device operating independently, or may include two or more computing device operating in concert, in parallel, sequentially or the like; two or more computing devices may be included together in a single computing device or in two or more computing devices. Processor 112 may interface or communicate with one or more additional devices as described below in further detail via a network interface device. Network interface device may be utilized for connecting processor 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 112 may include but is not limited to, for example, a computing device or cluster of computing devices in a first location and a second computing device or cluster of computing devices in a second location. Processor 112 may include one or more computing devices dedicated to data storage, security, distribution of traffic for load balancing, and the like. Processor 112 may distribute one or more computing tasks as described below across a plurality of computing devices of computing device, which may operate in parallel, in series, redundantly, or in any other manner used for distribution of tasks or memory between computing devices. Processor 112 may be implemented using a "shared nothing" architecture in which data is cached at the worker, in an embodiment, this may enable scalability of system 100 and/or computing device.

With continued reference to FIG. 1, processor 112 may be designed and/or configured to perform any method, method step, or sequence of method steps in any embodiment described in this disclosure, in any order and with any degree of repetition. For instance, processor 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may include a memory 116 communicatively connected to the at least a processor 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, processor 112 may include a flight controller, such as a flight controller described below with reference to FIG. 3. In some embodiments, memory 116 may include instructions that may configure the at least a processor 112 to perform various tasks. Instructions may be received from, but not limited to, an external computing device, user input, and the like.

Still referring to FIG. 1, apparatus 100 may be communicatively connected to at least a sensing device 120. A "sensing device", as used in this disclosure, is a device that is configured to detect a phenomenon and transmit information related to the detection of the phenomenon. Sensing device 120 may be configured to transduce a detected phenomenon, such as without limitation, voltage, current, speed, direction, force, torque, temperature, pressure, and the like, into a sensed signal. In one or more embodiments, sensing device 120 may include a plurality of sensors. Sensing device 120 may include, but is not limited to, an electrical sensor, an imaging sensor, such as a camera or infrared sensor, a motion sensor, an inertia measurement unit (IMU), a radio frequency sensor, a light detection and ranging (LIDAR) sensor, an orientation sensor, a temperature sensor, a humidity sensor, or the like, as discussed further below in this disclosure. In one or more embodiments, and without limitation, sensing device 120 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensing device 120 may include a contact or a non-contact sensor. Sensing device 120 may include a plurality of sensing devices. Sensing device 120 may include one or more sensor suites, such as a sensor suite described below with reference to FIG. 4. Sensing device 120 may be in communicative connection with battery pack 108. Sensing device 120 may detect and/or measure at least a parameter of battery pack 108 of electric aircraft 104, such as, but not limited to, state of charge, capacity, temperature, voltages, currents, resistances, and the like.

Still referring to FIG. 1, sensing device 120 may be configured to generate aircraft data 124 as a function of one or more detected phenomenon. "Aircraft data" as used in this disclosure is information pertaining to one or more parts, components, or systems of an aircraft. Aircraft data 124 may include, but is not limited to, battery temperature, battery health, battery charge, battery current, battery voltage, aircraft altitude, aircraft velocity, aircraft acceleration, rotor torque, aircraft power systems, and the like. Sensing device 120 may be configured to generate aircraft data 124 as a function of at least a parameter of battery pack 108 of electric aircraft 108 and transmit aircraft data 124 to processor 112, and the processor 112 may be configured to receive the aircraft data 124 from the sensing device 120. Processor 112 may be configured to perform an in-flight assessment of battery pack 108, which may be consistent with disclosure of such in U.S. patent application Ser. No. 16/599,538, filed on Oct. 11, 2019, and titled "SYSTEMS AND METHODS FOR IN-FLIGHT OPERATIONAL ASSESSMENT", which is incorporated by reference herein in its entirety. Processor 112 may receive aircraft data 124 wirelessly and/or wired from sensing device 120. Sensing device 120 may be in communicative connection with a propulsor 128. For the purposes of this disclosure, a "propulsor" is a component or device used to propel a craft by exerting force on a fluid medium, which may include a gaseous medium such as air or a liquid medium such as water. Propulsor 128 may include any device or component that consumes electrical power on demand to propel an electric aircraft in a direction while on ground or in-flight. For example, and without limitation, propulsor may include a rotor, propeller, paddle wheel, and the like thereof. In an embodiment, propulsor may include a plurality of blades that radially extend from a hub of the propulsor so that the blades may convert a rotary motion from a motor into a swirling slipstream. In an embodiment, blade may convert rotary motion to push an aircraft forward or backward. For instance, and without limitation, propulsor 128 may include an assembly including a rotating power-driven hub, to which several radially-extending airfoil-section blades are fixedly attached thereto, where the whole assembly rotates about a central longitudinal axis A. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates. Propulsor 128 may include a plurality of propulsors. In one or more exemplary embodiments, propulsor 128 may include a vertical propulsor and/or a forward propulsor. A forward propulsor, also referred to as a pusher propulsor, may include a propulsor configured to propel electric aircraft 104 in a forward direction. A vertical propulsor, also referred to as a lift propulsor, may include a propulsor configured to lift electric aircraft 104 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In one or more embodiments, propulsor 128 may include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. In one or more embodiments, propulsor 128 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force electric aircraft 104 in a horizontal direction along a longitudinal axis of electric aircraft 104. As a further non-limiting example, pusher component may twist and/or rotate to pull air behind it and, at the same time, push electric aircraft 104 forward with an equal amount of force. In an embodiment, and without limitation, the more air forced behind aircraft, the greater the thrust force with which electric aircraft 104 is pushed horizontally will be. In another embodiment, and without limitation, forward thrust may force electric aircraft 104 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components. Propulsor 128 may include, but is not limited to, a motor, rotor, stator, blades, inverters, and the like. Propulsor 128 may be as described below with reference to FIG. 2. Sensing device 120 may detect and/or measure values of propulsor 128, such as, but not limited to, rotational speeds, torques, voltages, currents, temperatures, and the like. Processor 112 may be configured to determine a current flight mode based on measurements by sensing device 120 of propulsor 128.

Still referring to FIG. 1, processor 112 may be configured to determine a reserve energy 132 as a function of a flight mode of electric aircraft 104. As used in this disclosure, a "reserve energy" is an amount of energy and/or battery charge reserved that is not included in a determination of a resource remaining datum discussed below. Reserve energy 132 may be a predetermined amount of energy and/or battery charge, such as an amount of energy sufficient to safely land electric aircraft 104. Reserve energy 132 may be an amount of energy and/or battery charge determined by one or more algorithms as described below. Reserve energy 132 may be based on a current flight mode of electric aircraft 104 and/or a flight mode in a flight plan. A "flight mode" as used in this disclosure is a type of flight an electric aircraft engages in. Flight modes may include, but are not limited to, takeoff, hovering, climbing, cruising, descent, approach, hovering, landing, and any transition between thereof. Flight mode may include fixed-wing flight and/or rotor-based flight. As a non-limiting example, a flight mode of takeoff may drain a battery pack and/or battery cells of an electric aircraft faster than a cruising flight mode. Likewise, a hovering rotor-based flight mode may require more energy than a rotor-based descent flight mode, which may be attributed to a reduced rotor speed. For example, a predetermined reserve energy 132 may be higher if electric aircraft 104 is hovering or a rotor-based landing is in flight plan than a predetermined reserve energy 132 if the electric aircraft 104 is cruising or a fixed-wing landing is in the flight plan.

Reserve energy 132 may be predetermined for any amount. Processor 112 may be configured to set an amount of reserve energy 132 based on flight plan. Processor 112 may determine reserve energy 132 based on a model, type, and/or history of performance of battery pack 108. Processor 112 may be configured to retrieve flight plan and/or battery pack 108 information from memory 116 and/or from a remote database. For example, and without limitation, reserve energy 132 if electric aircraft 104 is cruising and/or expected to cruise based on flight plan may be 5% charge of battery pack 108, 10% charge of the battery pack 108, 15% charge of battery pack 108, or any other amount; reserve energy 132 if electric aircraft 104 is hovering and/or expected to hover based on flight plan may be 15% charge of battery pack 108, 20% charge of battery pack 108, 25% charge of battery pack 108, 30% charge of battery pack 108, or any other amount. Reserve energy 132 may be a first amount of charge of battery pack 108 if electric aircraft 108 is in fixed-wing flight mode or flight plan includes a fixed-wing landing, and reserve energy 132 may be a second amount of charge of battery pack 108 if the electric aircraft is in rotor-based flight mode or the flight plan includes a rotor-based landing, wherein the second amount may be greater than the first amount.

With continued reference to FIG. 1, processor 112 may utilize one or more algorithms or generate one or more machine-learning models, such as reserve model 136, to output reserve energy 132. Processor 112 may be configured to determine reserve energy 132 by utilizing reserve model 136 trained to output reserve energy 132 as a function of training data and the flight mode, wherein the training data comprises correlating reserve energy labels and flight mode labels. Reserve model 136 may be configured to output a reserve energy 132 using a machine-learning process as a function of training data, such as reserve training data, and flight mode and/or information about battery pack 108, such as a model, type, and/or history of performance of the battery pack 108. The machine-learning process may include a supervised, autonomous, lazy learning, reinforcement, neural net machine-learning process, and/or the like. Reserve model 136 may perform one or more mathematical operations, manipulations, arithmetic, machine-learning, or a combination thereof on one or more elements of data. Reserve model 136 may be configured to provide a linear approximation of a nonlinear system. Linearization is a linear approximation of a nonlinear system that is valid in a small region around an operating point. Linearization may be employed in higher order systems such that inputs and outputs may be more easily controlled using a control loop. For example, and without limitations, linearization can be used with feedforward control, open loop control, feedback control, among others, alone or in combination.

With continued reference to FIG. 1, processor 112 may receive reserve training data, which may include correlated reserve energy labels and corresponding flight mode labels and/or battery labels. As used in this disclosure, "reserve energy labels" are examples of amounts of reserve energy 132, "flight mode labels" are types of flight modes corresponding to the reserve energy labels, and "battery labels" are information of battery packs 108 corresponding to the reserve energy labels such as model, type, and/or history of performance of the battery packs 108. Flight mode labels may be previous flight modes flown and may be from previous flight plans flown. Battery labels may be information of the corresponding battery pack 108 used for the previous flight modes flown. Flight mode labels and/or battery labels may be inputted into reserve training data with their corresponding reserve energy labels for reserve model 136 to learn to correlate flight mode labels and/or battery labels to their corresponding reserve energy labels. In some embodiments, processor 112 may include reserve training data. In some embodiments, processor 112 may be configured to receive reserve training data and/or a parameter set of the reserve training data, wherein the processor 112 may create a local object, data structure, and/or the like. Processor may train reserve energy model with reserve training data, wherein reserve energy model may output reserve energy 132 as a function of reserve training data and input flight mode and/or information of battery pack 108.

With continued reference to FIG. 1, processor 112 may utilize one or more algorithms or generate one or more machine-learning models, such as remainder model 144, to output resource remaining datum 140. Processor 112 may be configured to determine resource remaining datum 140 by utilizing a remainder model 144 trained to output resource remaining datum 140 as a function of aircraft data, reserve energy 132, and training data, such as remainder training data, wherein remainder training data comprises correlating reserve energy labels, flight mode labels, and battery labels. As used in this disclosure, a "resource remaining datum" is a determined energy remaining in excess of reserve energy 132. Resource remaining datum 140 may include a flight time remainder. As used in this disclosure, a "flight time remainder" is a determined time remaining of flight based on remaining energy and/or battery charge of an electric aircraft in excess of reserve energy 132. Processor 112 may be configured to receive aircraft data 124 from sensing device 120, as discussed above, which may include a current charge of battery pack 108. Processor 112 may determine resource remaining datum 140 based on current charge of battery pack 108 in excess of reserve energy 132. Resource remaining datum 140 may be based on flight mode. For example, processor 112 may be configured to determine resource remaining datum 140 based on a current flight mode of electric aircraft 104 and/or an expected flight mode in flight plan. For example, processor 112 may be configured to determine resource remaining datum 140 if electric aircraft 104 hovers, cruises, is in fixed-wing flight, is in rotor-based flight, performs fixed-wing landing, and/or performs rotor-based landing. Processor 112 may determine a plurality of resource remaining data 140 based on a plurality of flight modes for a pilot to consider flight options. Processor 112 may utilize one or more algorithms to determine resource remaining datum 140 based on current charge of battery pack 108. The machine-learning process may include a supervised, autonomous, lazy learning, reinforcement, neural net machine-learning process, and/or the like. Remainder model 144 may perform one or more mathematical operations, manipulations, arithmetic, machine-learning, or a combination thereof on one or more elements of data. Remainder model 144 may be configured to provide a linear approximation of a nonlinear system. Linearization is a linear approximation of a nonlinear system that is valid in a small region around an operating point. Linearization may be employed in higher order systems such that inputs and outputs may be more easily controlled using a control loop. For example, and without limitations, linearization can be used with feedforward control, open loop control, feedback control, among others, alone or in combination.

With continued reference to FIG. 1, remainder training data may include correlated resource remaining datum labels and corresponding flight mode labels and charge labels. As used in this disclosure, "resource remaining datum labels" are examples of resource remaining datum 140, "flight mode labels" are examples of flight modes corresponding to the resource remaining datum labels, and "charge labels" are charges of battery packs 108 in excess of reserve energy 132. Flight mode labels may be previous flight modes flown and may be from previous flight plans flown, resource remaining datum labels may be previous flight times corresponding to the previous flight modes flown, and charge labels may be collected from the amount of charge of battery packs 108 used during the flight times. Flight mode labels and/or charge labels may be inputted into remainder training data with their corresponding remainder labels for remainder model 144 to learn to correlate flight mode labels and charge labels to their corresponding resource remaining datum labels. In some embodiments, processor 112 may include remainder training data. In some embodiments, processor 112 may be configured to receive remainder training data and/or a parameter set of the remainder training data, wherein the processor 112 may create a local object, data structure, and/or the like.

Still referring to FIG. 1, in some embodiments, apparatus 100 may determine reserve energy 132 and/or resource remaining datum 140 as a function of aircraft data from a hybrid aircraft. For example, aircraft data may include a remaining level of fuel that is fed to at least a generator. Apparatus 100 may determine reserve energy 132 and/or resource remaining datum 140 as a function remaining fuel level. A hybrid aircraft may be consistent with disclosure of a hybrid aircraft as described in U.S. patent application Ser. No. 17/734,015, filed Apr. 30, 2022, and titled "SYSTEM FOR AN INTEGRAL HYBRID ELECTRIC AIRCRAFT", U.S. patent application Ser. No. 17/734,014, filed Apr. 30, 2022, and titled "HYBRID PROPULSION SYSTEMS FOR AN ELECTRIC AIRCRAFT", and U.S. patent application Ser. No. 17/733,487, filed Apr. 29, 2022, and titled "HYBRID ELECTRIC VERTICAL TAKEOFF AND LANDING AIRCRAFT", each of which is incorporated by reference herein in their entirety.

Still referring to FIG. 1, in some embodiments, apparatus 100 may communicate resource remaining datum 140 to pilot indicator 128. A "pilot indicator" as used in this disclosure is a device capable of conveying aircraft information to a user. Pilot indicator 128 may include, but is not limited to a display, such as, as non-limiting examples, light emitting diode (LED) displays, liquid crystal displays (LCD), and the like. As used in this disclosure, a "display" is a device configured to provide a visual representation of information. Pilot indicator 128 may display resource remaining datum 140, amount of reserve energy 132 that has been used, and/or amount of reserve energy 132 remaining, all of which may be displayed quantitatively with numerical values and/or qualitatively such as with color coding like green, yellow, and/or red to signify the amount of each level. Pilot indicator 128 may represent the amount of flight range remaining based on resource remaining datum 140. Pilot indicator 128 may include alerts such as, but not limited to, visual alerts, audio alerts, and the like. Alert may be an alarm to signal to pilot that immediate attention is required. Apparatus 100 may alert a user through pilot indicator 128 when resource remaining datum 140 approaches zero. Visual alert may include words, images, and/or colors appearing on pilot indicator 128 identifying resource remaining datum 140, amount of reserve energy 132 that has been used, and/or amount of reserve energy 132 remaining. Visual alert may include one or more flashing lights. Audio alert may include beeping and/or an auditory explanation of the alert, such as identifying resource remaining datum 140, amount of reserve energy 132 that has been used, and/or amount of reserve energy 132 remaining. Alert may also include a haptic alert on pilot controls and/or seat.

Still referring to FIG. 1, apparatus 100 may generate a power saving flight plan as a function of resource remaining datum 140. A "power saving flight plan" as used in this disclosure is a set of actions that minimizes power usage of an aircraft. A power saving flight plan may include recommendations that may be displayed through pilot indicator 128, such as, but not limited to, turning off lighting systems, turning off AC systems, reducing speed, adjusting flight paths, adjusting flight modes, and the like. As a non-limiting example, a power saving flight plan may include turning off cargo lights, reducing altitude, reducing speed, and taking a more direct route to a destination. Apparatus 100 may be configured to automatically engage in a power saving plan. As a non-limiting example, apparatus 100 may determine electric aircraft 104 is at 30% fuel remaining. Apparatus 100 may automatically reduce high energy consuming operations of electric aircraft 104. In some embodiments, processor 112 may be configured to display power saving flight plan on pilot indicator 148 in communication with the processor 112. Display of power saving flight plan may include a trajectory of electric aircraft 104 according to the power saving flight plan, a list of steps to perform the power saving flight plan, a path on a map, and/or the like. A user may accept or reject a power saving flight plan. Power saving flight plan may include changing a vertical rotor-based landing to conventional fixed-wing landing, which requires less energy. Power saving flight plan may include changing a location of landing to a closer location and/or a location with a landing strip on which a conventional fixed-wing landing may be performed. Apparatus 100 generating power saving flight plan may be consistent with disclosure of in-flight re-routing in U.S. patent application Ser. No. 17/528,673, filed on Nov. 17, 2021, and titled "SYSTEMS AND METHODS FOR IN-FLIGHT RE-ROUTING OF AN ELECTRIC AIRCRAFT", which is incorporated by reference herein in its entirety.

Figure 2:
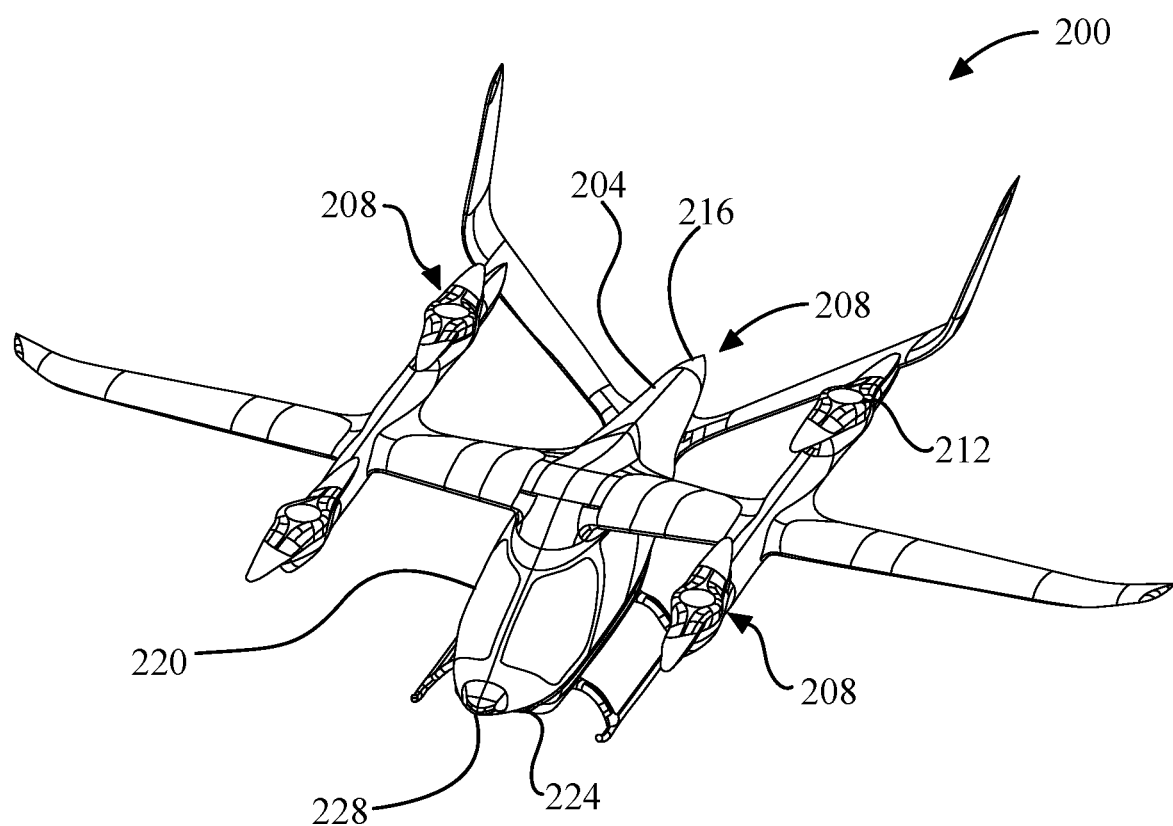
FIG. 2 is an exemplary embodiment of an electric aircraft.

Referring now to FIG. 2, an exemplary embodiment of an electric aircraft 200 is illustrated. Electric aircraft 200, and any of its features, may be used in conjunction with any of the embodiments of the present disclosure. Electric aircraft 200 may include any of the aircrafts as disclosed herein including electric aircraft 104 of FIG. 1. In an embodiment, electric aircraft 200 may be an electric vertical takeoff and landing (eVTOL) aircraft. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, airliners, rotorcrafts, vertical takeoff and landing aircrafts, jets, airships, blimps, gliders, paramotors, quadcopters, unmanned aerial vehicles (UAVs) and the like. As used in this disclosure, an "electric aircraft" is an electrically powered aircraft such as one powered by one or more electric motors or the like. In some embodiments, electrically powered (or electric) aircraft may be an electric vertical takeoff and landing (eVTOL) aircraft. Electric aircraft 200 may be capable of rotor-based cruising flight, rotor-based takeoff, rotor-based landing, fixed-wing cruising flight, airplane-style takeoff, airplane-style landing, and/or any combination thereof. Electric aircraft 200 may include one or more manned and/or unmanned aircrafts. Electric aircraft 200 may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 2, as used in this disclosure, a "vertical take-off and landing (VTOL) aircraft" is one that can hover, take off, and land vertically. An "electric vertical takeoff and landing aircraft" or "eVTOL aircraft", as used in this disclosure, is an electrically powered aircraft typically using an energy source, of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight. As used in this disclosure, "fixed-wing landing", also known as airplane-style landing, is a landing technique for an aircraft with fixed-wings in which the aircraft descends while continuing a forward motion, thus requiring a landing strip or a site with a minimum runway length to function as a landing strip.

Still referring to FIG. 2, electric aircraft 200, in some embodiments, may generally include a fuselage 204, a flight component 208 (or a plurality of flight components 208), a pilot control 220, flight controller 224, and an aircraft sensor 228 (or a plurality of aircraft sensors 228). In one embodiment, flight components 208 may include at least a lift component 212 (or a plurality of lift components 212) and at least a pusher component 216 (or a plurality of pusher components 216).

Still referring to FIG. 2, as used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may include structural elements that physically support a shape and structure of an aircraft. Structural elements may take a plurality of forms, alone or in combination with other types. Structural elements may vary depending on a construction type of aircraft such as without limitation a fuselage 204. Fuselage 204 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 2, it should be noted that an illustrative embodiment is presented only, and this disclosure in no way limits the form or construction method of any of the aircrafts as disclosed herein. In embodiments, fuselage 204 may be configurable based on the needs of the aircraft per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, electric aircraft 200 may include a plurality of laterally extending elements attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

Still referring to FIG. 2, electric aircraft 200 may include a plurality of flight components 208. As used in this disclosure a "flight component" is a component that promotes flight and guidance of an aircraft. Flight component 208 may include power sources, control links to one or more elements, fuses, and/or mechanical couplings used to drive and/or control any other flight component. Flight component 208 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

Still referring to FIG. 2, in an embodiment, flight component 208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 2, in an embodiment, plurality of flight components 208 of aircraft 200 may include at least a lift component 212 and at least a pusher component 216. Flight component 208 may include a propulsor, a propeller, a motor, rotor, a rotating element, electrical energy source, battery, and the like, among others. Each flight component may be configured to generate lift and flight of electric aircraft. In some embodiments, flight component 208 may include one or more lift components 212, one or more pusher components 216, one or more battery packs including one or more batteries or cells, and one or more electric motors. Flight component 208 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight.

Still referring to FIG. 2, in some embodiments, lift component 212 may include a propulsor, a propeller, a blade, a motor, a rotor, a rotating element, an aileron, a rudder, arrangements thereof, combinations thereof, and the like. Each lift component 212, when a plurality is present, of plurality of flight components 208 is configured to produce, in an embodiment, substantially upward and/or vertical thrust such that aircraft moves upward.

With continued reference to FIG. 2, as used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along the longitudinal axis, and a propeller produces torque along the vertical axis. In an embodiment, lift component 212 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 2, lift component 212 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 212 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 208 such as a power source(s) may apply a torque on lift component 212 to produce lift.

In an embodiment and still referring to FIG. 2, a plurality of lift components 212 of plurality of flight components 208 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 200. In another embodiment, and without limitation, the second set of lift components may be oriented along a line oriented 135° from the longitudinal axis, wherein the first set of lift components line and the second set of lift components are perpendicular to each other.

Still referring to FIG. 2, pusher component 216 and lift component 212 (of flight component(s) 208) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM,", U.S. Nonprovisional application Ser. No. 16/703,225, filed on Dec. 4, 2019, entitled "AN INTEGRATED ELECTRIC PROPULSION ASSEMBLY,", U.S. Nonprovisional application Ser. No. 16/910,255, filed on Jun. 24, 2020, entitled "AN INTEGRATED ELECTRIC PROPULSION ASSEMBLY,", U.S. Nonprovisional application Ser. No. 17/319,155, filed on May 13, 2021, entitled "AIRCRAFT HAVING REVERSE THRUST CAPABILITIES,", U.S. Nonprovisional application Ser. No. 16/929,206, filed on Jul. 15, 2020, entitled "A HOVER AND THRUST CONTROL ASSEMBLY FOR DUAL-MODE AIRCRAFT,", U.S. Nonprovisional application Ser. No. 17/001,845, filed on Aug. 25, 2020, entitled "A HOVER AND THRUST CONTROL ASSEMBLY FOR DUAL-MODE AIRCRAFT,", U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. Nonprovisional application Ser. No. 17/321,662, filed on May 17, 2021, entitled "AIRCRAFT FOR FIXED PITCH LIFT,", the entirety of each one of which is incorporated herein by reference. Any aircrafts, including electric and eVTOL aircrafts, as disclosed in any of these applications may efficaciously be utilized with any of the embodiments as disclosed herein, as needed or desired. Any flight controllers as disclosed in any of these applications may efficaciously be utilized with any of the embodiments as disclosed herein, as needed or desired.

Still referring to FIG. 2, pusher component 216 may include a propulsor, a propeller, a blade, a motor, a rotor, a rotating element, an aileron, a rudder, arrangements thereof, combinations thereof, and the like. Each pusher component 216, when a plurality is present, of the plurality of flight components 208 is configured to produce, in an embodiment, substantially forward and/or horizontal thrust such that the aircraft moves forward.

Still referring to FIG. 2, as used in this disclosure a "pusher component" is a component that pushes and/or thrusts an aircraft through a medium. As a non-limiting example, pusher component 216 may include a pusher propeller, a paddle wheel, a pusher motor, a pusher propulsor, and the like. Additionally, or alternatively, pusher flight component may include a plurality of pusher flight components. Pusher component 216 is configured to produce a forward thrust. As a non-limiting example, forward thrust may include a force to force aircraft to in a horizontal direction along the longitudinal axis. As a further non-limiting example, pusher component 216 may twist and/or rotate to pull air behind it and, at the same time, push aircraft 200 forward with an equal amount of force. In an embodiment, and without limitation, the more air forced behind aircraft, the greater the thrust force with which the aircraft is pushed horizontally will be. In another embodiment, and without limitation, forward thrust may force aircraft 200 through the medium of relative air. Additionally or alternatively, plurality of flight components 208 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 2, as used in this disclosure a "power source" is a source that powers, drives and/or controls any flight component and/or other aircraft component. For example, and without limitation power source may include a motor that operates to move one or more lift components 212 and/or one or more pusher components 216, to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 2, in an embodiment, aircraft 200 may include a pilot control 220. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 220 may include a collective, inceptor, foot bake, steering and/or control wheel, control stick, pedals, throttle levers, and the like. Pilot control 220 may be configured to translate a pilot's desired torque for each flight component of the plurality of flight components, such as and without limitation, pusher component 216 and lift component 212. Pilot control 220 may be configured to control, via inputs and/or signals such as from a pilot, the pitch, roll, and yaw of the aircraft. Pilot control may be available onboard aircraft or remotely located from it, as needed or desired.

Still referring to FIG. 2, as used in this disclosure a "collective control" or "collective" is a mechanical control of an aircraft that allows a pilot to adjust and/or control the pitch angle of plurality of flight components 208. For example and without limitation, collective control may alter and/or adjust the pitch angle of all of the main rotor blades collectively. For example, and without limitation pilot control 220 may include a yoke control. As used in this disclosure a "yoke control" is a mechanical control of an aircraft to control the pitch and/or roll. For example and without limitation, yoke control may alter and/or adjust the roll angle of aircraft 200 as a function of controlling and/or maneuvering ailerons. In an embodiment, pilot control 220 may include one or more foot-brakes, control sticks, pedals, throttle levels, and the like thereof. In another embodiment, and without limitation, pilot control 220 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 200 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 200 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 220 may be configured to modify a variable pitch angle. For example, and without limitation, pilot control 220 may adjust one or more angles of attack of a propulsor or propeller.

Still referring to FIG. 2, aircraft 200 may include at least an aircraft sensor 228. Aircraft sensor 228 may include any sensor or noise monitoring circuit described in this disclosure. Aircraft sensor 228, in some embodiments, may be communicatively connected or coupled to flight controller 224. Aircraft sensor 228 may be configured to sense a characteristic of pilot control 220. Sensor may be a device, module, and/or subsystem, utilizing any hardware, software, and/or any combination thereof to sense a characteristic and/or changes thereof, in an instant environment, for instance without limitation a pilot control 220, which the sensor is proximal to or otherwise in a sensed communication with, and transmit information associated with the characteristic, for instance without limitation digitized data. Sensor 228 may be mechanically and/or communicatively coupled to aircraft 200, including, for instance, to at least a pilot control 220. Aircraft sensor 228 may be configured to sense a characteristic associated with at least a pilot control 220. An environmental sensor may include without limitation one or more sensors used to detect ambient temperature, barometric pressure, and/or air velocity. Aircraft sensor 228 may include without limitation gyroscopes, accelerometers, inertial measurement unit (IMU), and/or magnetic sensors, one or more humidity sensors, one or more oxygen sensors, or the like. Additionally or alternatively, sensor 228 may include at least a geospatial sensor. Aircraft sensor 228 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, aircraft sensor 228 may be configured to sense a characteristic associated with any pilot control described in this disclosure. Non-limiting examples of aircraft sensor 228 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, aircraft sensor 228 may sense a characteristic as an analog measurement, for instance, yielding a continuously variable electrical potential indicative of the sensed characteristic. In these cases, aircraft sensor 228 may additionally comprise an analog to digital converter (ADC) as well as any additionally circuitry, such as without limitation a Wheatstone bridge, an amplifier, a filter, and the like. For instance, in some cases, aircraft sensor 228 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, aircraft sensor 228 may sense a characteristic of a pilot control 220 digitally. For instance in some embodiments, aircraft sensor 228 may sense a characteristic through a digital means or digitize a sensed signal natively. In some cases, for example, aircraft sensor 228 may include a rotational encoder and be configured to sense a rotational position of a pilot control; in this case, the rotational encoder digitally may sense rotational "clicks" by any known method, such as without limitation magnetically, optically, and the like. Aircraft sensor 228 may include any of the sensors as disclosed in the present disclosure. Aircraft sensor 228 may include a plurality of sensors. Any of these sensors may be located at any suitable position in or on aircraft 200.

Figure 3:
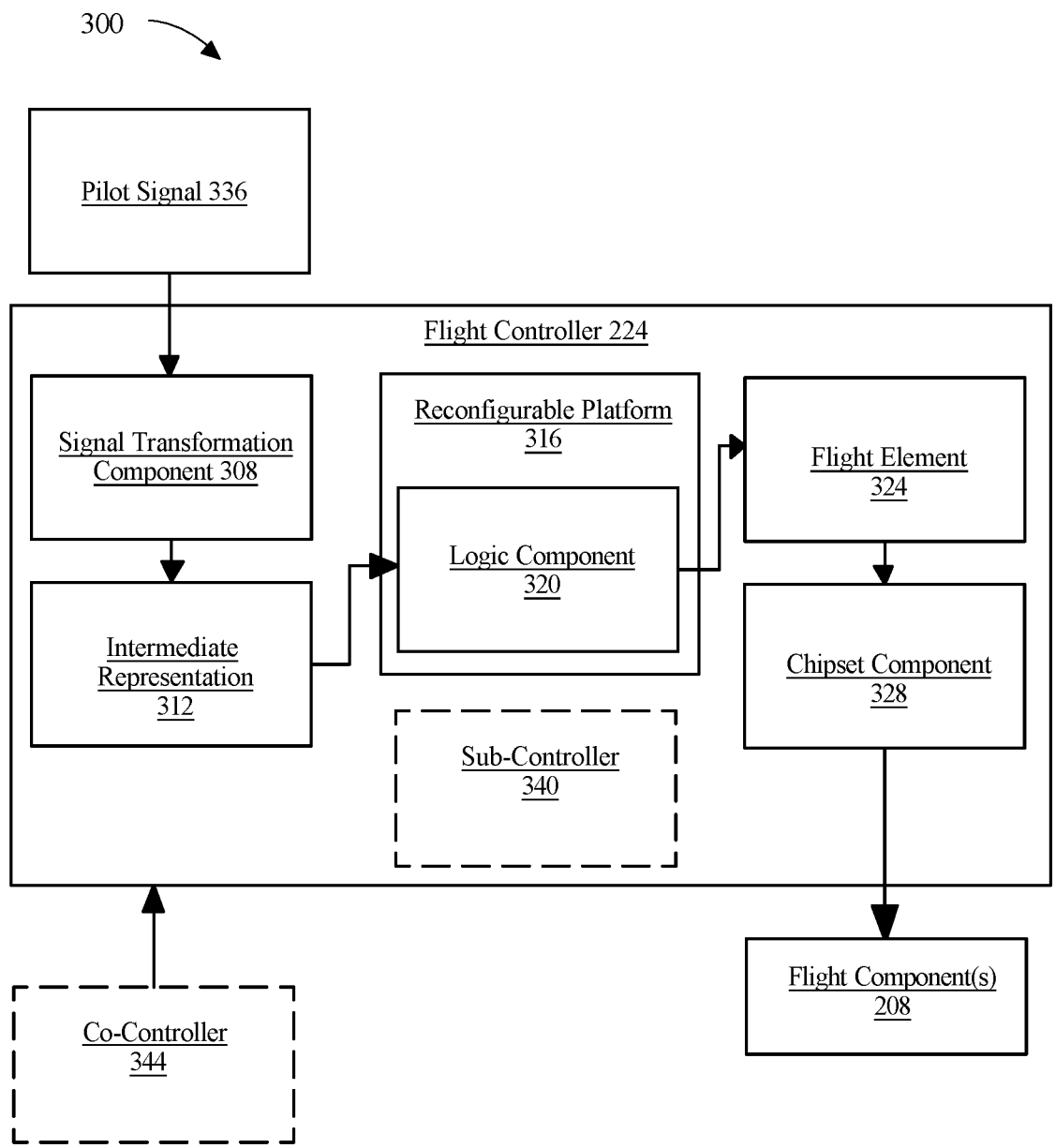
FIG. 3 is an exemplary embodiment of a flight controller.

With continued reference to FIG. 2, in some embodiments, electric aircraft 200 includes, or may be coupled to or communicatively connected to, flight controller 224 which is described further with reference to FIG. 3. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 224, in an embodiment, is located within fuselage 204 of aircraft. In accordance with some embodiments, flight controller is configured to operate a vertical lift flight (upwards or downwards, that is, takeoff or landing), a fixed wing flight (forward or backwards), a transition between a vertical lift flight and a fixed wing flight, and a combination of a vertical lift flight and a fixed wing flight.

Still referring to FIG. 2, in an embodiment, and without limitation, flight controller 224 may be configured to operate a fixed-wing flight capability. A "fixed-wing flight capability" can be a method of flight wherein the plurality of laterally extending elements generate lift. For example, and without limitation, fixed-wing flight capability may generate lift as a function of an airspeed of aircraft 200 and one or more airfoil shapes of the laterally extending elements. As a further non-limiting example, flight controller 224 may operate the fixed-wing flight capability as a function of reducing applied torque on lift (propulsor) component 212. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller 224 may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 2, flight controller 224 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155. Flight controller 224 may efficaciously include any flight controllers as disclosed in U.S. Nonprovisional application Ser. No. 17/319,155, filed on May 13, 2021, and entitled "AIRCRAFT HAVING REVERSE THRUST CAPABILITIES,".

In an embodiment, and still referring to FIG. 2, flight controller 224 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift component of the plurality of lift components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference. Flight controller 224 may efficaciously include any flight controllers as disclosed in U.S. Nonprovisional application Ser. Nos. 17/222,539 and 17/113,647.

With continued reference to FIG. 2, flight controller 224 may include one or more computing devices. Computing device may include any computing device as described in this disclosure. Flight controller 224 may be onboard aircraft 200 and/or flight controller 224 may be remote from aircraft 200, as long as, in some embodiments, flight controller 224 is communicatively connected to aircraft 200. As used in this disclosure, "remote" is a spatial separation between two or more elements, systems, components or devices. Stated differently, two elements may be remote from one another if they are physically spaced apart. In an embodiment, flight controller 224 may include a proportional-integral-derivative (PID) controller.

Now referring to FIG. 3, an exemplary embodiment 300 of a flight controller 224 is illustrated. As used in this disclosure a "flight controller" is a computing device of a plurality of computing devices dedicated to data storage, security, distribution of traffic for load balancing, and flight instruction. Flight controller 224 may include and/or communicate with any computing device as described in this disclosure, including without limitation a microcontroller, microprocessor, digital signal processor (DSP) and/or system on a chip (SoC) as described in this disclosure. Further, flight controller 224 may include a single computing device operating independently, or may include two or more computing device operating in concert, in parallel, sequentially or the like; two or more computing devices may be included together in a single computing device or in two or more computing devices. In embodiments, flight controller 224 may be installed in an aircraft, may control the aircraft remotely, and/or may include an element installed in the aircraft and a remote element in communication therewith.

In an embodiment, and still referring to FIG. 3, flight controller 224 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions.

In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 224. For example, and without limitation, native machine language may include one or more binary and/or numerical languages.

Still referring to FIG. 3, in an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 224 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 224. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 224 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 208. As used in this disclosure (and with particular reference to FIG. 3) a "flight component" is a portion of an aircraft that can be moved or adjusted to affect one or more flight elements. For example, flight component 208 may include a component used to affect the aircrafts' roll and pitch which may comprise one or more ailerons. As a further example, flight component 208 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 224 may be configured generate an autonomous function. As used in this disclosure an "autonomous function" is a mode and/or function of flight controller 224 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 224 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 224 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 224 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 224 to control and/or maintain a portion of aircraft, a portion of the flight plan, the entire aircraft, and/or the entire flight plan. As a further non-limiting example, pilot signal 336 may include an implicit signal, wherein flight controller 224 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 224 and/or a remote device may or may not use in the generation of autonomous function. As used in this disclosure "remote device" is an external device to flight controller 224. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 224 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 224 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 224. Remote device and/or FPGA may transmit a signal, bit, datum, or parameter to flight controller 224 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 224 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 224 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 224 may include, but is not limited to, for example, a cluster of flight controllers in a first location and a second flight controller or cluster of flight controllers in a second location. Flight controller 224 may include one or more flight controllers dedicated to data storage, security, distribution of traffic for load balancing, and the like. Flight controller 224 may be configured to distribute one or more computing tasks as described below across a plurality of flight controllers, which may operate in parallel, in series, redundantly, or in any other manner used for distribution of tasks or memory between computing devices. For example, and without limitation, flight controller 224 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 208. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 224. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 224 may also be implemented using a "shared nothing" architecture in which data is cached at the worker, in an embodiment, this may enable scalability of aircraft and/or computing device. Flight controller 224 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 224 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 224 as components and/or nodes of a distributer flight controller as described above. For example, and without limitation, co-controller 344 may include one or more controllers and/or components that are similar to flight controller 224. As a further non-limiting example, co-controller 344 may include any controller and/or component that joins flight controller 224 to distributer flight controller. As a further non-limiting example, co-controller 344 may include one or more processors, logic components and/or computing devices capable of receiving, processing, and/or transmitting data to and/or from flight controller 224 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 224 may be designed and/or configured to perform any method, method step, or sequence of method steps in any embodiment described in this disclosure, in any order and with any degree of repetition. For instance, flight controller 224 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
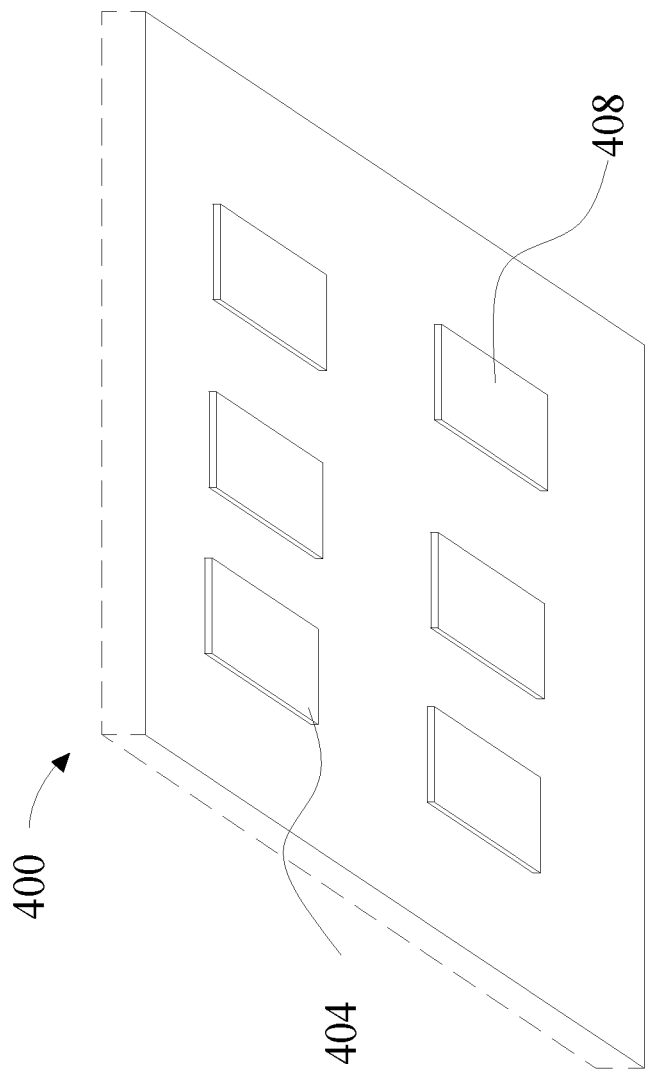
FIG. 4 is an exemplary embodiment of a sensor suite.

Referring now to FIG. 4, an embodiment of sensor suite 400 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on a battery pack measuring temperature, electrical characteristic such as voltage, amperage, resistance, or impedance, or any other parameters and/or quantities of the battery pack or components of the battery pack as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor suite 400 and/or user to detect phenomenon is maintained and in a non-limiting example, a user alter aircraft usage pursuant to sensor readings.

Still referring to FIG. 4, sensor suite 400 may include a moisture sensor 404. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 404 may be psychrometer. Moisture sensor 404 may be a hygrometer. Moisture sensor 404 may be configured to act as or include a humidistat. A "humidistat", for the purposes of this disclosure, is a humidity-triggered switch, often used to control another electronic device. Moisture sensor 404 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 4, sensor suite 400 may include electrical sensors 408. Electrical sensors 408 may be configured to measure voltage across a component, electrical current through a component, and resistance of a component. Electrical sensors 408 may include separate sensors to measure each of the previously disclosed electrical characteristics such as voltmeter, ammeter, and ohmmeter, respectively.

Alternatively or additionally, and with continued reference to FIG. 4, sensor suite 400 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 400 and/or a control circuit incorporated therein and/or communicatively connected thereto may be configured to adjust charge to one or more battery cells as a function of a charge level and/or a detected parameter. For instance, and without limitation, sensor suite 400 may be configured to determine that a charge level of a battery cell is high based on a detected voltage level of that battery cell or portion of the battery pack. Sensor suite 400 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 400 may include digital sensors, analog sensors, or a combination thereof. Sensor suite 400 may include digital-to-analog converters (DAC), analog-to-digital converters (ADC, A/D, A-to-D), a combination thereof, or other signal conditioning components used in transmission of a first plurality of battery pack data to a destination over wireless or wired connection.

With continued reference to FIG. 4, sensor suite 400 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts of cell failure including, in non-limiting examples, electrical anomalies as detected by any of the previous disclosed sensors or components.

With continued reference to FIG. 4, sensor suite 400 may be configured to detect events where voltage nears an upper voltage threshold or lower voltage threshold. An upper voltage threshold may be stored in a data storage system for comparison with an instant measurement taken by any combination of sensors present within sensor suite 400. An upper voltage threshold may be calculated and calibrated based on factors relating to battery cell health, maintenance history, location within battery pack, designed application, and type, among others. Sensor suite 400 may measure voltage at an instant, over a period of time, or periodically. Sensor suite 400 may be configured to operate at any of these detection modes, switch between modes, or simultaneous measure in more than one mode. A lower voltage threshold may indicate power loss to or from an individual battery cell or portion of the battery pack. Events where voltage exceeds the upper and lower voltage threshold may indicate battery cell failure or electrical anomalies that could lead to potentially dangerous situations for aircraft and personnel that may be present in or near its operation.

Figure 5:
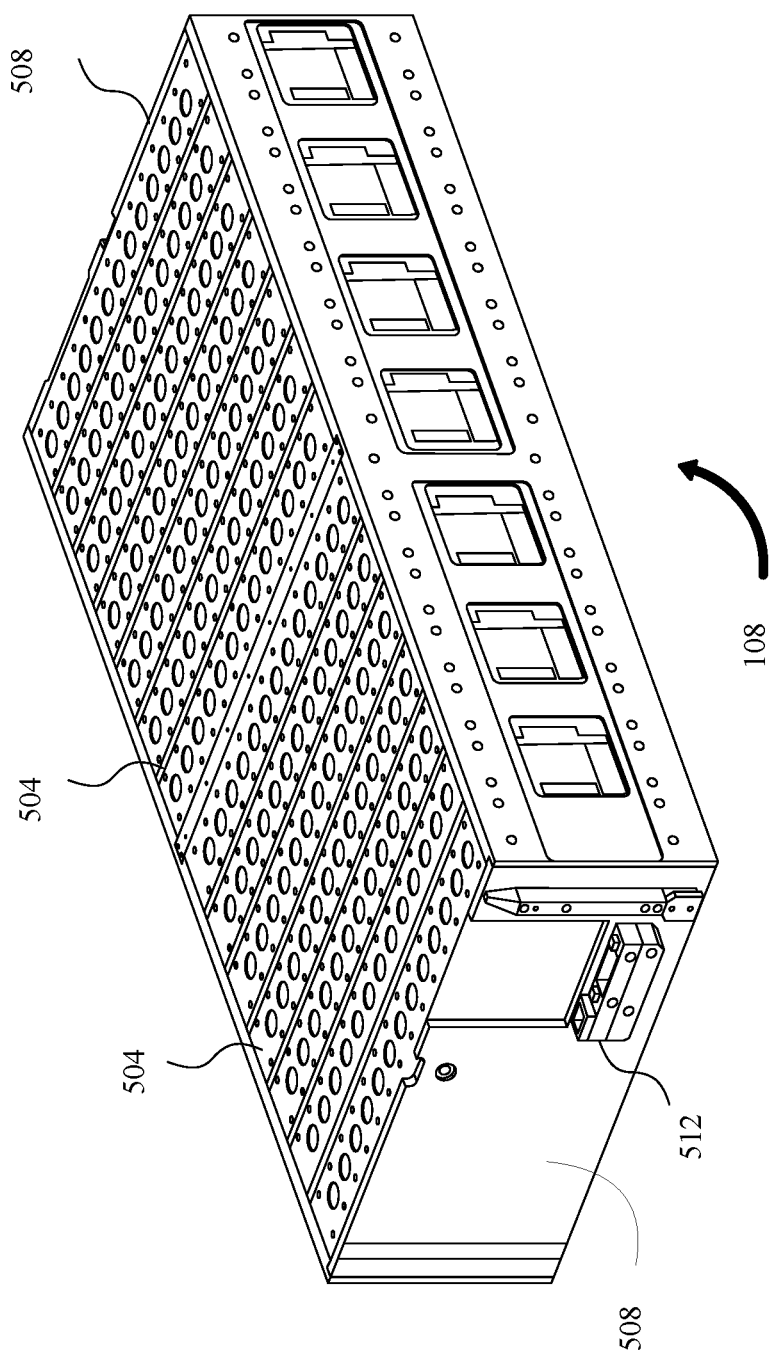
FIG. 5 is an illustration of exemplary embodiments of battery pack configured for use in an electric vehicle in isometric view in accordance with one or more aspects of the present disclosure.

Referring now to FIG. 5, an exemplary embodiment of an electric vehicle battery pack is illustrated. Battery pack 108 is a power source that may be configured to store electrical energy in the form of a plurality of battery modules, which themselves include of a plurality of electrochemical cells. These cells may utilize electrochemical cells, galvanic cells, electrolytic cells, fuel cells, flow cells, pouch cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired", but one of ordinary skill in the art would appreciate that this term is synonymous with "electrically connected", and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, and without limitation, battery pack 108 include 196 battery cells in series and 18 battery cells in parallel. This is, as someone of ordinary skill in the art would appreciate, is only an example and battery pack 108 may be configured to have a near limitless arrangement of battery cell configurations. Battery pack 108 may be designed to the Federal Aviation Administration (FAA)'s Design Assurance Level A (DAL-A), using redundant DAL-B subsystems.

With continued reference to FIG. 5, battery pack 108 may include a plurality of battery modules 504. Battery modules 504 may be wired together in series and in parallel. Battery pack 108 may include a center sheet which may include a thin barrier. The barrier may include a fuse connecting battery modules on either side of the center sheet. The fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Battery pack 108 may also include a side wall includes a laminate of a plurality of layers configured to thermally insulate the plurality of battery modules from external components of battery pack 108. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack 108 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIGS. 5A and 5B, battery pack 108 may also include an end panel 508 including a plurality of electrical connectors and further configured to fix battery pack 108 in alignment with at least the side wall. End panel 508 may include a plurality of electrical connectors of a first gender configured to electrically and mechanically connect to electrical connectors of a second gender. The end panel may be configured to convey electrical energy from battery cells to at least a portion of an eVTOL aircraft, for example, using an HV connection 512. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIG. 5, sensor suite 400 may be disposed in or on a portion of battery pack 108 near battery modules or battery cells. In one or more embodiments, sensing device 120, as shown in FIG. 1, may be configured to communicate with an electric aircraft, such as a flight controller of electric aircraft 104, using a controller area network (CAN). In one or more embodiments, a controller area network may include a bus. Bus may include an electrical bus. Bus may refer to power busses, audio busses, video busses, computing address busses, and/or data busses. Bus may be additionally or alternatively responsible for conveying electrical signals generated by any number of components within battery pack 108 to any destination on or offboard an electric vehicle.

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (Op-Amp), filter, digital/analog conversion, linearization circuit, current-voltage change circuits, resistance change circuits, an error compensator circuit, a combination thereof or otherwise undisclosed components.

With continued reference to FIG. 5, any of the disclosed components or systems, namely battery pack 108 and/or battery cell 604 may incorporate provisions to dissipate heat energy present due to electrical resistance in integral circuit. Battery pack 108 includes one or more battery element modules wired in series and/or parallel. The presence of a voltage difference and associated amperage inevitably will increase heat energy present in and around battery pack 108 as a whole. The presence of heat energy in a power system is potentially dangerous by introducing energy possibly sufficient to damage mechanical, electrical, and/or other systems present in at least a portion of an electric aircraft. Battery pack 108 may include mechanical design elements, one of ordinary skill in the art, may thermodynamically dissipate heat energy away from battery pack 108. The mechanical design may include, but is not limited to, slots, fins, heat sinks, perforations, a combination thereof, or another undisclosed element.

Heat dissipation may include material selection beneficial to move heat energy in a suitable manner for operation of battery pack 108. Certain materials with specific atomic structures and therefore specific elemental or alloyed properties and characteristics may be selected in construction of battery pack 108 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 108 may include similar or identical features and materials ascribed to battery pack 108 in order to manage the heat energy produced by these systems and components.

According to embodiments, the circuitry disposed within or on battery pack 108 may be shielded from electromagnetic interference. The battery elements and associated circuitry may be shielded by material such as mylar, aluminum, copper a combination thereof, or another suitable material. The battery pack 108 and associated circuitry may include one or more of the aforementioned materials in their inherent construction or additionally added after manufacture for the express purpose of shielding a vulnerable component. The battery pack 108 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Figure 6:
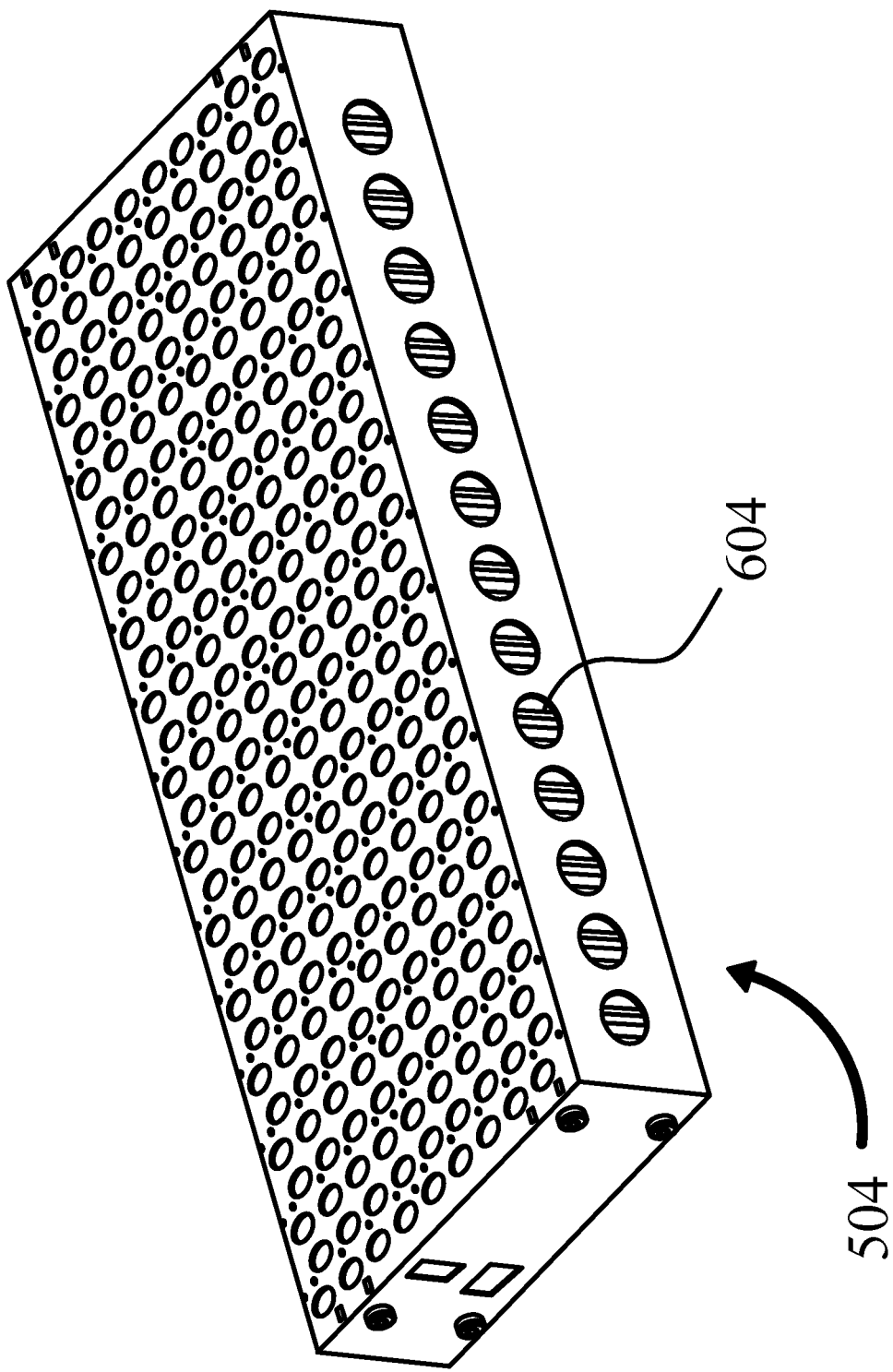
FIG. 6 is an illustration of exemplary embodiments of battery module configured for use in an electric vehicle in isometric view in accordance with one or more aspects of the present disclosure.

Now referring to FIG. 6, a battery module 504 is illustrated. Battery module 504 may be a battery module in battery pack 108 shown in FIG. 5. Battery module 504 may include a plurality of battery cells 604 as previously discussed.

Figure 7:
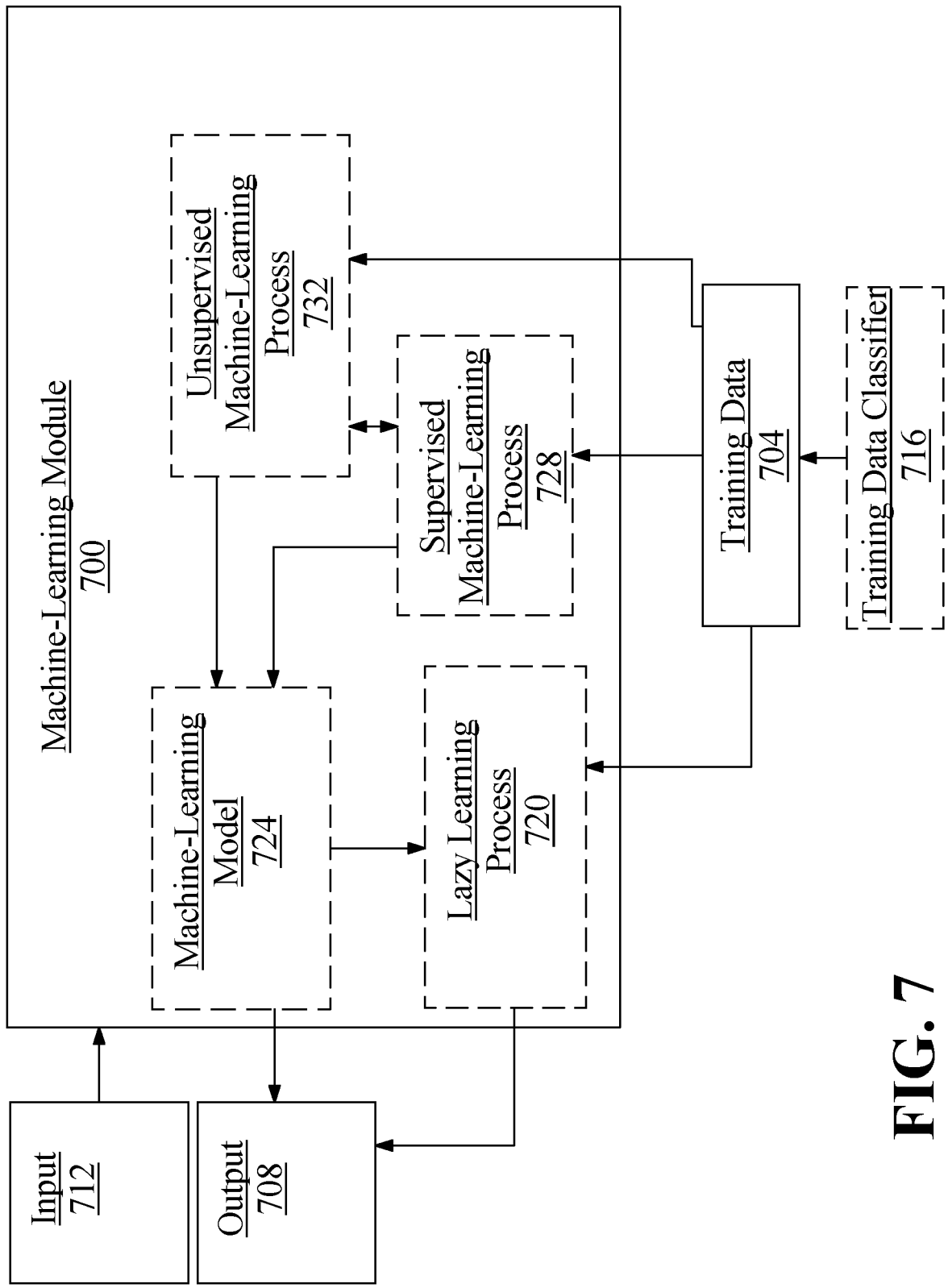
FIG. 7 is a block diagram of a machine learning model.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process", as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include aircraft data and outputs may include most limiting parameters.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like.

Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to flight parameters, such as battery pack temperatures, torque outputs, battery state of charge, battery state of health, and the like.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include aircraft data as described above as inputs, most limiting parameters as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
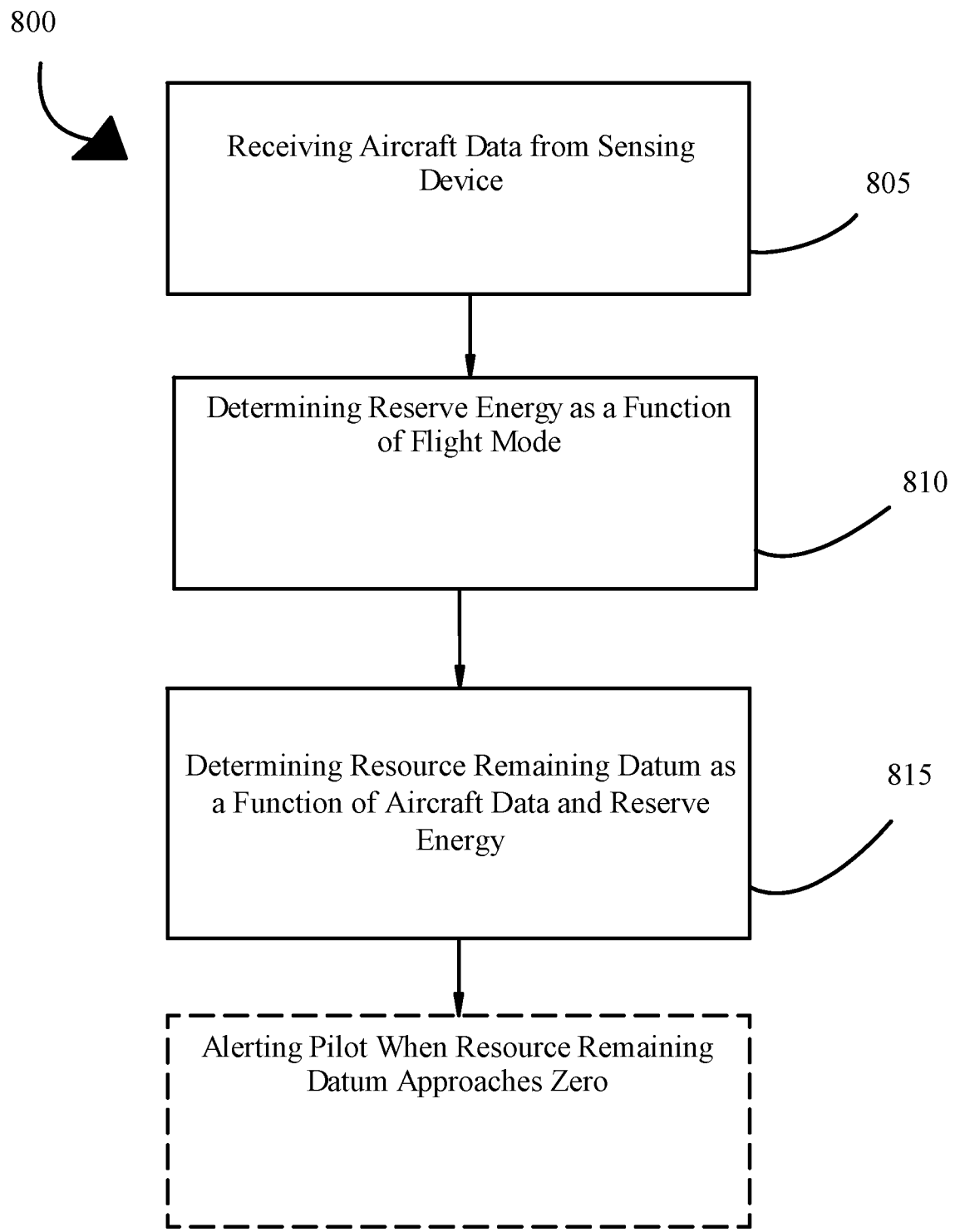
FIG. 8 is a flow diagram of an exemplary method for determining a resource remaining datum of an electric aircraft.

Referring now to FIG. 8, method 800 for determining resource remaining datum of electric aircraft is presented. At step 805, processor receives aircraft data from at least a sensing device, wherein the at least sensing device is configured to measure at least a parameter of battery pack of electric aircraft and generate aircraft data as a function of at least a parameter of battery pack of electric aircraft. This step may be implemented without limitation as described above in FIGS. 1-8. Parameter of electric aircraft may include current charge of battery pack.

Still referring to FIG. 8, at step 810, processor determines reserve energy as a function of flight mode of electric aircraft. This step may be implemented without limitation as described above in FIGS. 1-8. Reserve energy may be based on flight plan of electric aircraft. Processor may be configured to determine reserve energy by utilizing a machine learning model trained to output reserve energy as a function of training data and flight mode, wherein the training data comprises correlating reserve energy labels and flight mode labels.

Still referring to FIG. 8, at step 815, processor determines resource remaining datum as a function of aircraft data and reserve energy, wherein the resource remaining datum is related to battery pack of electric aircraft. This step may be implemented without limitation as described above in FIGS. 1-8. Processor may be configured to communicate resource remaining datum to pilot indicator communicatively connected to the processor, wherein the pilot indicator is configured to display the resource remaining datum to user. Processor may be configured to determine a plurality of resource remaining data based on a plurality of flight modes. Processor may be configured to determine resource remaining datum by utilizing a machine learning model trained to output resource remaining datum as a function of training data, aircraft data, and reserve energy, wherein the training data comprises correlating reserve energy labels, flight mode labels, and battery labels. Processor and memory communicatively connected to the processor may be further configured to generate a power saving flight plan as a function of the resource remaining datum. Processor may be further configured to display power saving flight plan on pilot indicator communicatively connected to the processor. Processor may be configured to alert a pilot when resource remaining datum approaches zero.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
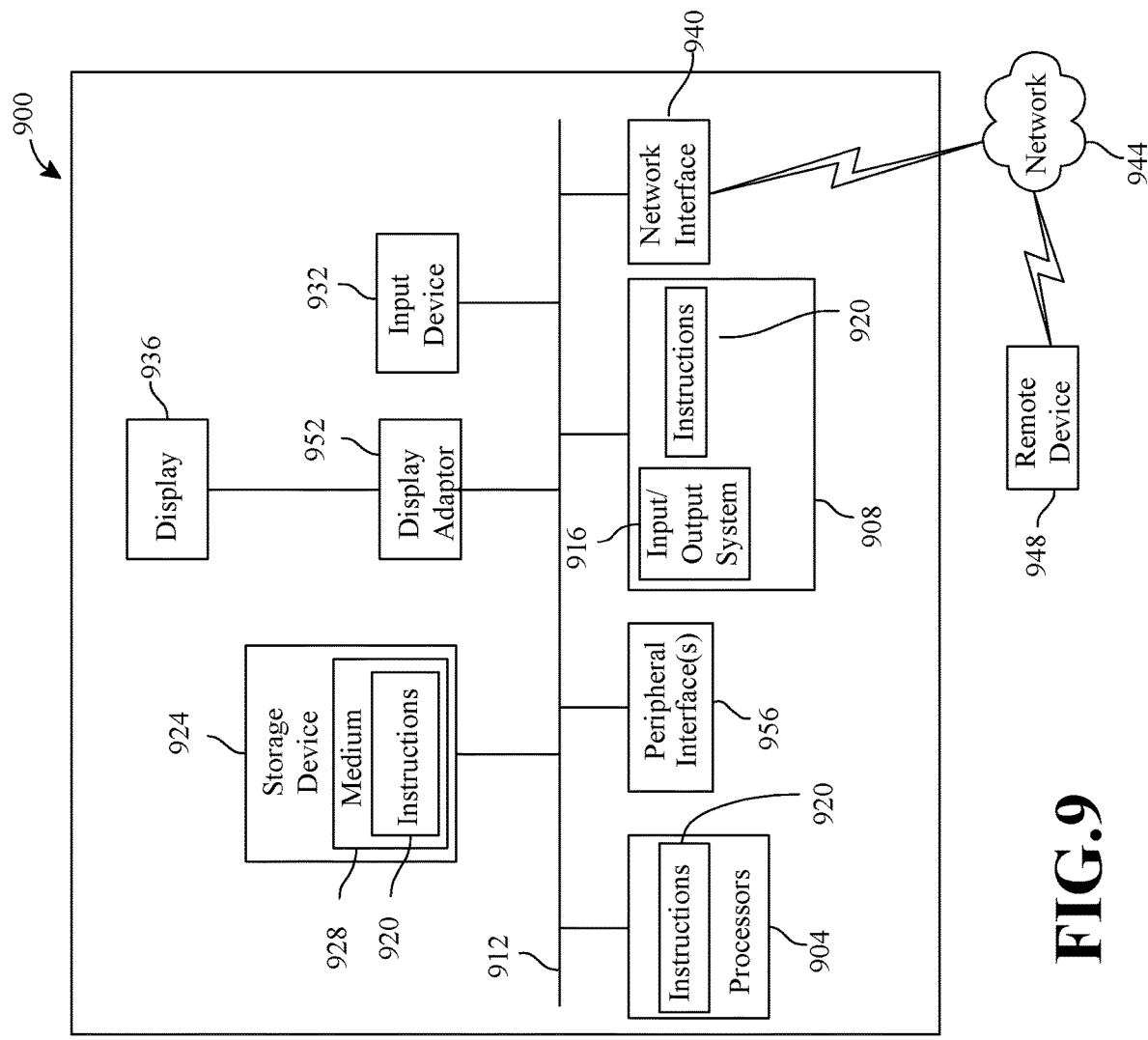
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Still referring to FIG. 9, processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 9, memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Still referring to FIG. 9, computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Still referring to FIG. 9, computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

Still referring to FIG. 9, a user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Still referring to FIG. 9, computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft, comprising:
   at least a battery pack disposed in the electric aircraft;
   at least a sensing device communicatively connected to the at least a battery pack, the at least a sensing device configured to:
      measure at least a parameter of the at least a battery pack of the electric aircraft; and
      generate aircraft data as a function of the at least a parameter of the at least a battery pack of the electric aircraft; and
   an apparatus for determining a resource remaining datum, the apparatus comprising:
      a processor; and
      a memory communicatively connected to the processor, the memory containing instructions configuring the processor to:
         receive the aircraft data from the at least a sensing device;
         determine a first reserve energy according to the aircraft data and a first flight plan that includes a hover flight mode;
         determine a second reserve energy according to the aircraft data and a second flight plan that includes a cruising flight mode and does not include a hover flight mode; and
         generate at least one power saving flight plan as a function of the determined first and second reserve energy, the power saving flight plan comprising a flight path adjustment, wherein the electric aircraft is controlled based on the power saving flight plan.

2. The electric aircraft of claim 1, wherein the processor is configured to:
   determine a resource remaining datum as a function of the aircraft data and the determined first and second reserve energy, wherein the resource remaining datum is related to the battery pack of the electric aircraft; and
   communicate the resource remaining datum to a pilot indicator communicatively connected to the processor, wherein the pilot indicator is configured to display the resource remaining datum to a user.

3. The electric aircraft of claim 1, wherein the at least a parameter of the battery pack of the electric aircraft comprises a current charge of the battery pack.

4. The electric aircraft of claim 1, wherein the processor is configured to determine the first reserve energy by utilizing a machine learning model trained to output the first reserve energy as a function of training data and the flight mode, wherein the training data comprises correlating reserve energy labels to flight mode labels.

5. The electric aircraft of claim 2, wherein the processor is configured to determine the resource remaining datum by utilizing a machine learning model trained to output the resource remaining datum as a function of training data, the aircraft data, and the first and second reserve energy, wherein the training data comprises correlating reserve energy labels, flight mode labels, and battery labels.

6. The electric aircraft of claim 1, wherein the processor is further configured to display the power saving flight plan on a pilot indicator communicatively connected to the processor.

7. The electric aircraft of claim 2, wherein the processor is configured to alert a user when the resource remaining datum approaches zero.

8. A method for determining a resource remaining datum of an electric aircraft, comprising:
   measuring, by at least a sensing device disposed on the electric aircraft, at least a parameter of a battery pack of the electric aircraft;
   generating, by the at least a sensing device, aircraft data as a function of the at least a parameter of the battery pack of the electric aircraft;
   receiving, by a processor, aircraft data from the at least a sensing device communicatively connected to the electric aircraft;
   determining, by the processor, a first reserve energy according to the aircraft data and a first flight plan that includes a hover flight mode;
   determining, by the processor, a second reserve energy according to the aircraft data and a second flight plan that includes a cruising flight mode and does not include a hover flight mode;
   and
   generating, by the processor, at least one power saving flight plan as a function of the determined first and second reserve energy, the power saving flight plan comprising a flight path adjustment, wherein the electric aircraft is controlled based on the power saving flight plan.

9. The method of claim 8, further comprising:
   determining a resource remaining datum as a function of the aircraft data and the determined first and second reserve energy, wherein the resource remaining datum is related to the battery pack of the electric aircraft;
   communicating the resource remaining datum to a pilot indicator in communication with the processor; and
   displaying, using the pilot indicator, the resource remaining datum to a user.

10. The method of claim 8, wherein the at least a parameter of the battery pack of the electric aircraft comprises a current charge of the battery pack.

11. The method of claim 8, wherein determining the first reserve energy comprises utilizing a machine learning model trained to output the first reserve energy as a function of training data and the flight mode, wherein the training data comprises correlating reserve energy labels and flight mode labels.

12. The method of claim 9, wherein determining the resource remaining datum comprises utilizing a machine learning model trained to output the resource remaining datum as a function of training data, the aircraft data, and the first and second reserve energy, wherein the training data comprises correlating reserve energy labels, flight mode labels, and battery labels.

13. The method of claim 8, further comprising displaying the power saving flight plan on a pilot indicator communicatively connected to the processor.

14. The method of claim 9, further comprising alerting a user when the resource remaining datum approaches zero.

* * * * *